Patented Oct. 23, 1934

1,977,632

UNITED STATES PATENT OFFICE

1,977,632

PRODUCTION OF ETHYL ALCOHOL FROM ETHYLENE

George Frederick Horsley, Norton-on-Tees, England, assignor to Imperial Chemical Industries Limited, a corporation of Great Britain No Drawing. Application December 15, 1931, Serial No. 581,276. In Great Britain December 15, 1930

7 Claims. (Cl. 260—156)

This invention relates to the production of ethyl alcohol by catalytic hydration of ethylene and in particular to new catalysts for use therein.

It has already been proposed to prepare ethyl alcohol by heating ethylene and water under pressure, and in the presence of inorganic salts with an affinity for ethylene, e. g. mercuric chloride. It has also been proposed to prepare ethyl alcohol by treating ethylene with steam at an elevated temperature and under pressure in the presence of a dehydrating catalyst, e. g. thoria or phosphoric acid deposited on charcoal. Further, it has been proposed to prepare alcohols by combining one or more olefines with water in the vapour state, at a temperature of at least 100° C. and in the presence of a metal of the platinum group, or gold, silver, copper, iron, cobalt, nickel, chromium, tantalum, vanadium, tungsten, molybdenum, or manganese, or salts or compounds thereof.

According to the present invention, in the catalytic hydration of ethylene to produce ethyl alcohol, a catalyst is employed consisting of or comprising a phosphate of cadmium beryllium, zinc, aluminium, tin or lead. With respect to cadmium phosphate, it has been found that an especially active catalyst is obtained by heating together CdO and $P_2O_5$ in the molecular ratio of about 1:0.9. If the molecular proportion of $P_2O_5$ falls below 0.725, the activity of the catalyst falls off. The new catalysts may, if desired, be employed in conjunction with known catalysts, and/or in association with supports or carriers of an inert nature, e. g. pumice or asbestos. The catalysts are not poisoned by sulphur and although their activity tends to fall off if the partial pressure of steam is high they can be re-activated by allowing the steam pressure to fall temporarily while otherwise maintaining the reaction conditions.

In practicing the invention the reaction may be carried out in either the liquid or the vapour phase, and at ordinary or increased pressure, the reaction temperature being preferably 100–300° C. Thus, when working in the liquid phase, the olefine gas may be compressed to say 100 atmospheres, and brought into contact, e. g. in a counter-current packed tower, with an aqueous solution of a catalyst salt to which is added sufficient of the corresponding acid to prevent hydrolysis of the salt, at a temperature of 100–300° C. When working in the vapour phase it is preferred to employ a large excess of olefine relative to water vapour, the gaseous reaction products being cooled to separate an aqueous solution of the alcohol which is formed and the surplus ethylene being circulated.

Example 1

A catalyst was prepared by heating one molecular proportion of cadmium oxide with two molecular proportions of phosphoric acid in aqueous solution, the mixture being evaporated to dryness at a temperature of about 130° C. and the product made into small pellets. Over the catalyst thus obtained was passed a mixture of three volumes of ethylene and one volume of steam, at the ordinary pressure and at a temperature of 200° C., the time of contact of the gases with the catalyst being 0.6 minutes. The gaseous products were cooled to the ordinary temperature and the aqueous condensate collected. This condensate contained 3.6 per cent. by weight of ethyl alcohol, representing a conversion of ethylene of 0.5 per cent.

The activity of the above-described catalyst could be increased to some extent by prolonged heating in a closed vessel at a temperature of 130° C. prior to use in the process.

Example 2

A mixture of ethylene and steam under a total pressure of 100 atmospheres, the partial pressure of steam being 30 atmospheres and the partial pressure of ethylene 70 atmospheres, was passed over a catalyst prepared as in Example 1 but using 1.5 molecular proportions of phosphoric acid instead of two. The catalyst was maintained at 290° C and the time of contact of the gases was one minute. The products comprised 243 g. per hour of ethyl alcohol and 1.0 g. per hour of ethyl ether. The yield of alcohol on the ethylene used up was 95 per cent. with conversion of ethylene per passage of 3.36%. 6.9 g. per hour of oily product, resulting from the polymerization of part of the ethylene, was also formed.

The following table indicates the relative efficiencies of various catalysts falling within the invention. In each case the initial reaction mixture consisted of equal volumes of ethylene and steam, the pressure was the atmospheric, the temperature was 200° C. and the contact time was 6 seconds.

| Catalyst | Percent alcohol by weight in condensation | Percent conversion of ethylene |
|---|---|---|
| Cadmium phosphate | 1.0 | 0.39 |
| Aluminium phosphate +25% cadmium phosphate | 0.61 | 0.24 |
| Lead phosphate | 0.53 | 0.2 |
| Zinc phosphate | 0.26 | 0.1 |
| Aluminium phosphate | 0.19 | 0.07 |
| Tin phosphate | 0.44 | 0.18 |

In commercial practice, higher pressures would be used to secure larger yields, but the results at the atmospheric pressure provide a qualitative test of the various catalysts.

I claim:

1. In the process for the production of ethyl alcohol by the catalytic hydration of ethylene, the step which comprises contacting ethylene and water with a catalyst taken from the group consisting of tin and lead phosphates and those cadmium phosphates which are prepared by heating CdO and $P_2O_5$ in the molecular ratios of not more than 1:.725.

2. Process as claimed in claim 1, in which the catalytic hydration is carried out at a temperature of 100–300° C.

3. The process of claim 1 in which the catalytic hydration is carried out in the liquid phase.

4. The process of claim 1 in which the catalytic hydration is carried out in the vapor phase.

5. In the process for the production of ethyl alcohol by the catalytic hydration of ethylene, the step which comprises contacting ethylene and water with a catalyst comprising essentially tin phosphate.

6. In the process for the production of ethyl alcohol by the catalytic hydration of ethylene, the step which comprises contacting ethylene and water with a catalyst comprising essentially lead phosphate.

7. In the process for the production of ethyl alcohol by the catalytic hydration of ethylene, the step which comprises contacting ethylene and water with a catalyst comprising essentially cadmium phosphate which is prepared by heating CdO and $P_2O_5$ in the molecular ratios of not more than 1:.725.

GEORGE FREDERICK HORSLEY.